United States Patent [19]

Soeda et al.

[11] Patent Number: 5,212,226

[45] Date of Patent: May 18, 1993

[54] CARBON BLACK HAVING A HIGH SPECIFIC SURFACE AREA

[75] Inventors: Mizuo Soeda, Tokyo; Kazuyoshi Watanabe, Shimonoseki, both of Japan

[73] Assignee: Cabot Corporation, Boston, Mass.

[21] Appl. No.: 811,445

[22] Filed: Dec. 12, 1991

Related U.S. Application Data

[62] Division of Ser. No. 526,725, May 22, 1990, Pat. No. 5,110,576.

[30] Foreign Application Priority Data

May 23, 1988 [JP] Japan .................................. 1-129643

[51] Int. Cl.$^5$ .............................................. C08K 3/04
[52] U.S. Cl. ................................. 524/496; 524/495
[58] Field of Search ............................ 524/496, 495

[56] References Cited

U.S. PATENT DOCUMENTS

| | | | |
|---|---|---|---|
| 4,421,891 | 12/1983 | Miyake et al. | 524/495 |
| 5,059,408 | 10/1991 | Mito | 423/495 |
| 5,093,407 | 3/1992 | Komai et al. | 524/495 |
| 5,100,637 | 3/1992 | Nakai | 524/496 |
| 5,110,576 | 5/1992 | Soeda et al. | 423/445 |
| 5,124,396 | 6/1992 | Branan, Jr. et al. | 524/496 |

FOREIGN PATENT DOCUMENTS 9201628  2/1992  PCT Int'l Appl. ............... 423/445

*Primary Examiner*—Paul R. Michl
*Assistant Examiner*—Olga Asinovsky
*Attorney, Agent, or Firm*—Lawrence A. Chaletsky; Harry J. Gwinnell

[57] ABSTRACT

Carbon blacks having stable surface area and structure which, when incorporated into rubber compositions, impart increased abrasion resistance and lower hysteresis. Also disclosed are rubber composition incorporating the novel carbon blacks.

2 Claims, 2 Drawing Sheets

CARBON BLACK HAVING A HIGH SPECIFIC SURFACE AREA

This is a division of co-pending application Ser. No. 07/526,725 filed on May 22, 1990, now U.S. Pat. No. 5,110,576, issued May 5, 1992.

FIELD OF THE INVENTION

The present invention relates to a class of new and novel furnace carbon blacks which are suitable for various applications and particularly well suited for use in rubber compositions.

BACKGROUND

Carbon blacks are generally produced in a furnace-type reactor by pyrolyzing a hydrocarbon feedstock with hot combustion gases to produce combustion products containing particulate carbon black.

Carbon blacks may be utilized as pigments, fillers, reinforcing agents and for a variety of other applications. For example, carbon blacks are widely utilized as fillers and reinforcing pigments in the compounding and preparation of rubber compositions. Carbon blacks for rubber use have a variety of grades depending upon their properties and are generally classified on the basis of analytical properties including: specific surface area (iodine adsorption ($I_2$ No.); nitrogen surface area ($N_2SA$, etc.), structure (DBP absorption) and the like.

Most importantly, carbon blacks are effective in the preparation of rubber vulcanizates intended for usage in preparing tires. It is generally desirable in the production of tires to utilize carbon blacks which produce tires with satisfactory handling and cornering properties, abrasion resistance, and traction (wet and dry skid resistance). The grade of the carbon black used mainly for tire treads is classified into HAF (high abrasion furnace), ISAF (intermediate super abrasion furnace) and SAF (super abrasion furnace) with SAF carbon black having a higher surface area than ISAF carbon black which has a higher surface area than HAF carbon black. Abrasion resistance generally improves as surface area increases.

The properties of the grade of carbon black become an important factor in determining various performances of the rubber composition wherein the carbon blacks are incorporated. Generally, carbon blacks having a specific surface area higher than ISAF are used for tire treads of trucks and buses wherein natural rubber is used as a main component. HAF type carbon blacks are used for passenger car tire treads wherein synthetic rubbers such as SBR are used as a main component.

Higher surface area carbon blacks impart improved abrasion resistance to truck and bus tires. However, as specific surface area becomes larger, heat build-up of the rubber compound becomes higher and hysteresis becomes greater. The hysteresis of the compounds means the difference between the energy applied to deform a rubber compound, and the energy released as the rubber compound recovers to its initial undeformed state. Tires with lower hysteresis values have reduced rolling resistance and therefore reduce the fuel consumption of the vehicle utilizing the tire.

Thus it would be desirable to develop a carbon black which would impart both improved abrasion resistance and reduced hysteresis to rubber compounds. Tires prepared with such a carbon black would have lower rolling resistance, to improve the fuel economy of the vehicle utilizing the tire, and improved abrasion resistance, to reduce the tread wear of the tire.

Accordingly, one object of the present invention is the production of new carbon blacks which impart increased abrasion resistance and reduced hysteresis properties to natural rubbers, synthetic rubbers and blends of natural and synthetic rubbers incorporating the carbon blacks. The carbon blacks of this invention have stable surface area and stable structure.

Another object of the present invention is new rubber compositions, advantageous for use as commercial vehicle (truck or bus) tires, incorporating the new carbon blacks.

Other objects of the present invention will become apparent from the following description and the claims.

SUMMARY OF THE INVENTION

We have discovered a new class of carbon blacks having an Iodine Adsorption number ($I_2$ No.) of from at least about 135 mg/g (milligrams/gram) to about 200 mg/g, a DBP (dibutyl phthlate absorption number) of from at least about 105 cc/100g (cubic centimeters per 100 grams) to about 150 cc/100g, a ratio of CTAB surface area to $I_2$ No. (CTAB/$I_2$ No.) of 0.95 to 1.05, a ratio of $N_2SA$ to CTAB surface area ($N_2SA$/CTAB) of not greater than 1.05, a least 0.96 to about 1.0. The preferred carbon blacks of the present invention additionally have a ($\Delta D50$)C/($\Delta D50$)U ratio (($\Delta D50$) Compressed)/(($\Delta D50$) Uncompressed) of at least about 1.0 to not greater than 1.15. We have also discovered a new class of rubber compositions containing these carbon blacks.

Referring to the blacks of the present invention, when the $I_2$No. exceeds 200 mg/g, agglomeration of carbon black during mixing is likely to occur, leading to an increase of hysteresis loss. When $I_2$No. is below 135 mg/g, the reinforcing effect of the carbon blacks is reduced and the blacks fail to produce an advantageous rubber composition.

When the DBP of the carbon black is 105 cc/g or less, the reinforcing property of the carbon blacks is not sufficient and when the DBP exceeds 150 cc/g, the modulus of rubber compositions incorporating the carbon blacks becomes undesirably higher and the hardness of the rubber compositions also becomes undesirably higher.

The ratio of CTAB/$I_2$No. is a measure of surface chemical activity The larger the CTAB/$I_2$No. ratio, the higher the chemical surface activity. In the carbon blacks of the present invention when the CTAB/$I_2$No. ratio is 0.95 to 1.05, it is found that the reinforcing property and hysteresis loss of rubber compounds is improved presumably by an interaction between the rubber and carbon black based on the surface chemical activity.

The ratio of $N_2SA$/CTAB is a measure of carbon black surface porosity. The larger the $N_2SA$/CTAB ratio, the greater the porosity of the carbon black surface. When $N_2SA$/CTAB ratio is 1.05 or less the carbon black interacts effectively with the rubber composition.

The ratio of Dmode$_C$/Dmode$_U$ shows the stability of carbon black structure. When the value of the Dmode$_C$/Dmode$_U$ ratio is at least 0.96 to about 1.0, it is found that the structure is not broken during kneading and the initial performance of the carbon black can be maintained.

The carbon blacks of the present invention may be produced in a furnace carbon black reactor having a first (combustion) zone, and a reaction zone separated by a transition zone, into which all or part of a carbon black yielding feedstock may be injected into a hot combustion gas stream. The carbon black yielding feedstock is injected radially inwardly into the hot combustion gas stream from the outer periphery of the reactor and also radially outwardly injected from the center portion. The resultant mixture of hot combustion gases and feedstock passes into the reaction zone. Pyrolysis, of the carbon black yielding feedstock, is stopped by quenching the mixture when the carbon blacks of the present invention have been formed. Preferably pyrolysis is stopped by a quench injecting a quenching fluid, which in the Examples is water. A reactor suitable for use in producing the carbon blacks of the present invention is described generally in U.S. Pat. No. 3,922,335, the disclosure of which is hereby incorporated by reference. The process for preparing the novel carbon blacks of the present invention will be described in greater detail hereinafter.

The rubbers for which the novel carbon blacks of this invention are effective as reinforcing agents include natural and synthetic rubbers. Generally, amounts of the carbon black product ranging from about 10 to about 250 parts by weight can be used for each 100 parts by weight of rubber in order to impart a significant degree of reinforcement. It is, however, preferred to use amounts varying from about 20 to about 100 parts by weight of carbon black per 100 parts by weight of rubber and especially preferred is the utilization of from about 50 to about 100 parts of carbon black per 100 parts of rubber.

Among the rubbers suitable for use with the present invention are natural rubber and its derivatives such as chlorinated rubber; copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and penetene-1; particularly preferred are the ethylene-propylene copolymers wherein the ethylene content ranges from 20 to 90 percent by weight and also the ethylene-propylene polymers which additionally contain a third monomer such as dioyclopentadiene, 1,4-hexadiene and methylene norbornene.

An advantage of the carbon blacks of the present invention is that the carbon blacks impart increased abrasion resistance and lower hysteresis to compositions containing natural rubbers, synthetic rubbers or blends thereof in which the carbon blacks of the present invention are incorporated.

An advantage of the rubber compositions of the present invention is the that the rubber compositions are particularly well suited for use as commercial vehicle tires.

Other advantages of the present invention will become apparent from the following more detailed description of the invention.

DETAILED DESCRIPTION OF THE INVENTION

The carbon blacks of the present invention are characterized by having an $I_2$ No. of from at least about 135 mg/g to about 200 mg/g, a DBP of from at least about 105 cc/100 g to about 150 cc/100 g, a $CTAB/I_2No.$ ratio of 0.95 to 1.05, a $N_2SA/CTAB$ ratio of not greater than 1.05, a ratio of $Dmode_C/Dmode_U$ of at least 0.96 to about 1.0. The preferred carbon blacks are additionally characterized by having a $(\Delta D_{50})C/(\Delta D_{50})U$ ratio of at least about 1.0 to not greater than 1.15.

The carbon blacks of the present invention may be produced in a modular, also referred to as "staged", furnace carbon black reactor. A section of a typical modular furnace carbon black reactor which may be utilized to produce the carbon blacks of the present invention is depicted in FIG. 1.

Figure 1:
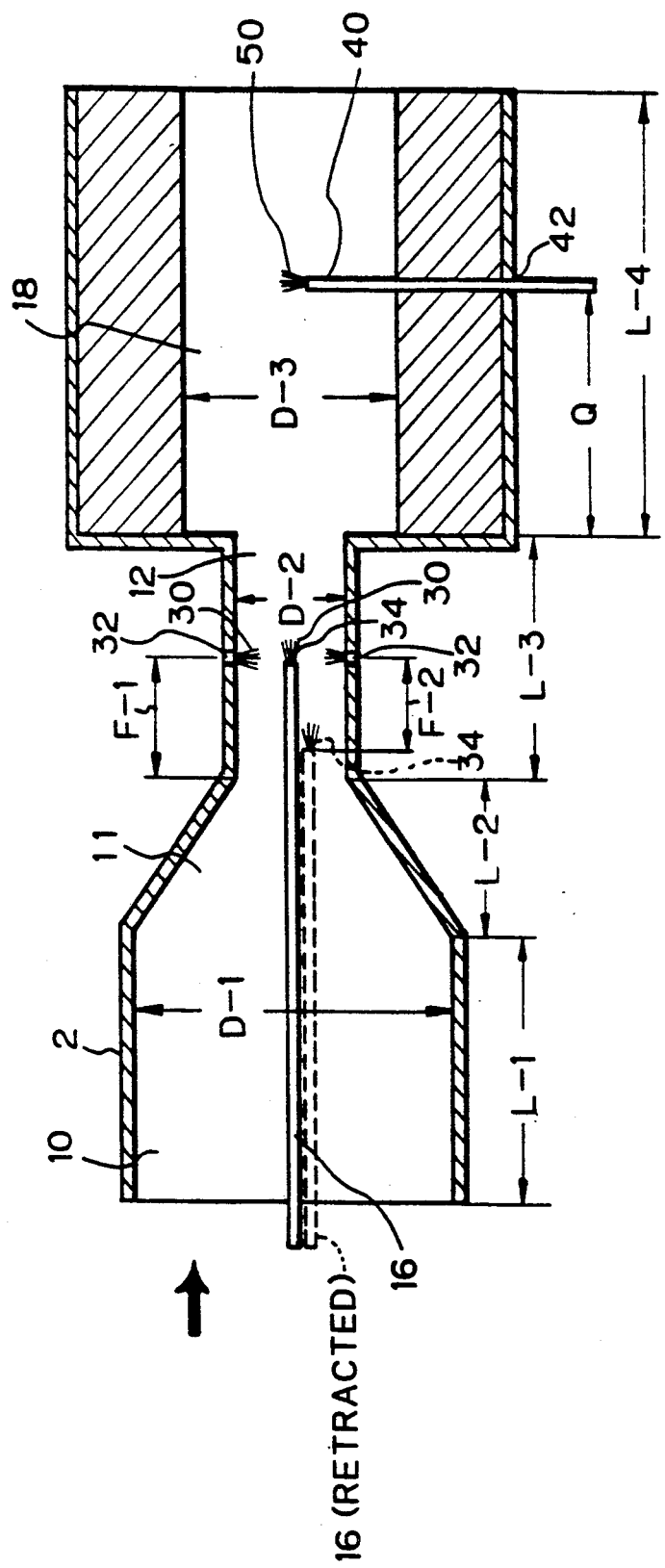
FIG. 1 is a cross-sectional view of a portion of one type of furnace carbon black reactor which may be utilized to produce the carbon blacks of the present invention.

Referring to FIG. 1, the carbon blacks of the present invention may be produced in a furnace carbon black reactor 2, having a combustion zone 10 which has a zone of converging diameter 11; transition zone 12; and reaction zone 18. The diameter of the combustion zone, 10, up to the point where the zone of converging diameter, 11, begins is shown as D-1; the diameter of zone 12, as D-2 and the diameter of the reaction zone, 18, as D-3. The length of the combustion zone, 10, up to the point where the zone of converging diameter, 11, begins is shown as L-1; the length of the zone of converging diameter is shown as L-2; the length of the transition zone is shown as L-3; the length of the reaction zone, 18, is shown as L-4. The carbon blacks described in the examples were produced in a reactor where D-1 is 20.7 inches (52.5 centimeters); D-2 is 12.4 inches (31.5 centimeters); D-3 is 18 inches (45.7 centimeters); L-1 is 37.5 inches (95.3 centimeters); L-2 is 29.5 inches (74.9 centimeters); L-3 is 11.5 inches (29.2 centimeters); and L-4 is 48 inches (121.9 centimeters).

To produce the carbon blacks of the present invention hot combustion gases are generated in combustion zone 10 by burning a liquid or gaseous fuel with a suitable oxidant stream such as air, oxygen, mixtures of air and oxygen or the like. Generally the amount of air introduced is between about 15,000 to 18,000 $Nm^3/Hr$. Among the fuels suitable for use in generating the hot combustion gases are included any of the readily combustible gas, vapor or liquid streams such as natural gas, hydrogen, carbon monoxide, methane, acetylene, alcohols, or kerosene. It is generally preferred, however, to utilize fuels having a high content of carbon-containing components and in particular, hydrocarbons. To facilitate the generation of hot combustion gases, the oxidant stream may be preheated such as to a temperature between 500° and 800° C.

The hot combustion gas stream flows downstream from zones 10 and 11 into zones 12, 14 and then 18. The direction of the flow of hot combustion gases is shown in the figure by the arrow. Carbon black-yielding feedstock, 30, is introduced both at point 32 (located in zone 12) and simultaneously through probe, 16, at point 34. Generally the amount of feedstock introduced is between about 4200 and 4500 kg/hr.. The distance from the end of the zone of converging diameter to point 32, is shown as F-1. The distance from point 32 upstream to point 34, is shown as F-2. To produce the carbon blacks of the present invention, the feedstock may be injected in an amount of from about 80% to about 40% by weight, at point 32, and the remainder of the total amount of from about 20% to about 60% by weight, injected at point 34. Preferably from about 75% to about 60% of the total amount of feedstock, by weight, is introduced at point 32, and the remainder of the total amount of feedstock, from about 25% to about 40% by weight, is introduced at point 34. In the examples described herein carbon black-yielding feedstock, 30, was injected in the form of a plurality of jets which penetrate into the interior regions of the hot combustion gas stream to insure a high rate of mixing and shearing of the hot combustion gases and the carbon black-yielding feedstock so as to rapidly and completely decompose and convert the feedstock to the novel carbon blacks of the present invention.

The mixture of carbon black-yielding feedstock and hot combustion gases flows downstream through zone 12 into reaction zone 18. Quench 40, located at point 42, injecting water 50, is utilized to stop pyrolysis of the carbon black-yielding feedstock when the novel carbon blacks of the present invention are formed. Point 42 may be determined in any manner known to the art, for selecting the position of a quench to stop pyrolysis. One method for determining the position of the quench to stop pyrolysis is by determining the point at which an acceptable toluene extract level for the novel carbon blacks of the present invention is achieved. Toluene extract level may be measured by using ASTM Test D1618-83 "Carbon Black Extractables - Toluene Discoloration". Q is the distance from the beginning of zone 18 to quench point 42, and will vary according to the position of the quench.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

The following testing procedures are used in the determination and evaluation of the analytical properties of the carbon blacks of the present invention, and the physical properties of the rubber compositions incorporating the carbon blacks of the present invention.

Nitrogen surface area of the carbon blacks ($N_2SA$) was determined according to ASTM D3037-88. Iodine adsorption number of the carbon blacks ($I_2No.$) was determined according to JIS K6221-1982. CTAB surface area (cetyltrimethylammonium bromide adsorption) was determined according to ASTM D3765-85. The DBP (Dibutyl Phthalate absorption value) of the carbon black pellets was determined according to the procedure set forth in JIS K6221- 1982. The carbon black pellets were crushed utilizing the procedure set forth in ASTM D 3493.

Figure 2:
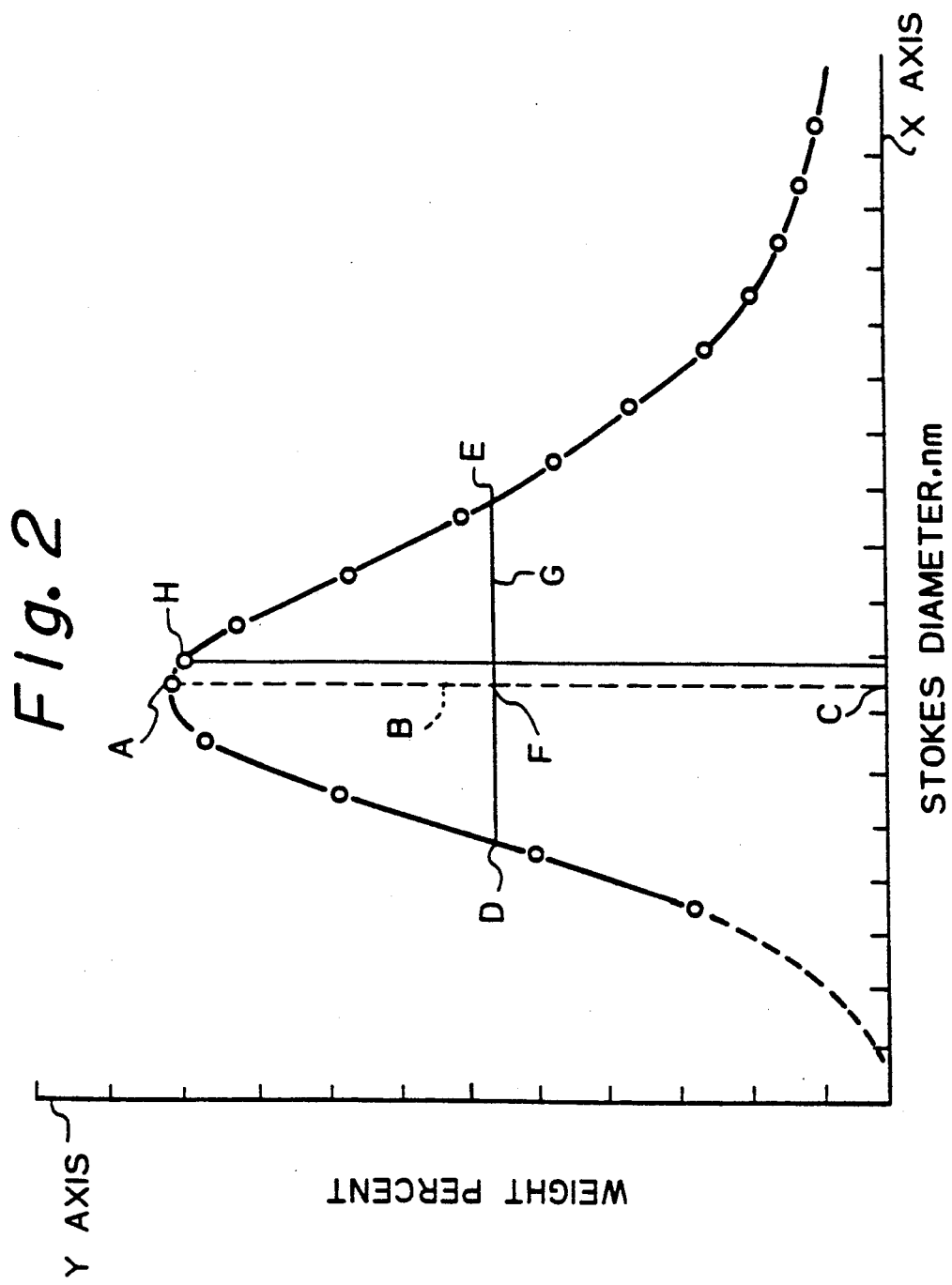
FIG. 2 is a graph with an example of a Stokes diameter distribution curve.

$\Delta D_{50}$ of the carbon blacks was determined in the following manner. A histogram is made of the Stokes diameter of the aggregates of the carbon black sample versus the relative frequency of their occurrence in a given sample. As shown in FIG. 2, a line (B) is drawn from the peak (A) of the histogram in a direction parallel to the Y axis, to and ending at the X-axis at point (C) of the histogram. The midpoint (F) of the resultant line (B) is determined and a line (G) is drawn through the midpoint (F) thereof parallel to the X-axis. Line (G) intersects the distribution curve of the histogram at two points D and E. The absolute value of the difference of the two Stokes diameters of the carbon black particles at points D and E is the $\Delta D$ 50 value. The data used to generate the histogram are determined by the use of a disk centrifuge such as the one manufactured by Joyce Loebl Co. Ltd. of Tyne and Wear, United Kingdom. The following procedure is a modification of the procedure described in the instruction manual of the Joyce Loebl disk centrifuge file reference DCF 4.008 published on Feb. 1, 1985, the teachings of which are hereby incorporated by reference, and was used in determining the data.

The procedure is as follows. 10 mg (milligrams) of a carbon black sample are weighed in a weighing vessel, then added to 50 cc of a solution of 10% absolute ethanol and 90% distilled water which is made 0.05% NONIDET P-40 surfactant (NONIDET P-40 is a registered trademark for a surfactant manufactured and sold by Shell Chemical Co.). The resulting suspension is dispersed by means of ultrasonic energy for 15 minutes using Sonifier Model No. W 385, manufactured and sold by Heat Systems Ultrasonics Inc., Farmingdale, New York.

Prior to the disk centrifuge run the following data are entered into the computer which records the data from the disk centrifuge:

1. The specific gravity of carbon black, taken as 1.86 g/cc;
2. The volume of the solution of the carbon black dispersed in a solution of water and ethanol, which in this instance is 0.5 cc.;
3. The volume of spin fluid, which in this instance is 10 cc of water;
4. The viscosity of the spin fluid, which in this instance is taken as 0.933 centipoise at 23 degrees C.;
5. The density of the spin fluid, which in this instance is 0.9975 g/cc at 23 degrees C;
6. The disk speed, which in this instance is 8000 rpm;
7. The data sampling interval, which in this instance is 1 second.

The disk centrifuge is operated at 8000 rpm while the stroboscope is operating. 10 cc of distilled water are injected into the spinning disk as the spin fluid. The turbidity level is set to 0; and 1 cc of the solution of 10% absolute ethanol and 90% distilled water is injected as a buffer liquid. The cut and boost buttons of the disk centrifuge are then operated to produce a smooth concentration gradient between the spin fluid and the buffer liquid and the gradient is monitored visually. When the gradient becomes smooth such that there is no distinguishable boundary between the two fluids, 0.5 cc of the dispersed carbon black in aqueous ethanol solution is injected into the spinning disk and data collection is started immediately. If streaming occurs the run is aborted. The disk is spun for 20 minutes following the injection of the dispersed carbon black in aqueous ethanol solution. Following the 20 minutes of spinning, the disk is stopped, the temperature of the spin fluid is measured, and the average of the temperature of the spin fluid measured at the beginning of the run and the temperature of the spin fluid measured at the end of the run is entered into the computer which records the data from the disk centrifuge. The data is analyzed according to the standard Stokes equation and is presented using the following definitions:

Carbon black aggregate—a discrete, rigid colloidal entity that is the smallest dispersible unit; it is composed of extensively coalesced particles;

Stokes diameter—the diameter of a sphere which sediments in a viscous medium in a centrifugal or gravitational field according to the Stokes equation. A non-spherical object, such as a carbon black aggregate, may also be represented in terms of the Stokes diameter if it is considered as behaving as a smooth, rigid sphere of the same density and rate of sedimentation as the non-spherical object. The customary units are expressed in nanometer diameters.

Mode (Dmode for reporting purposes)—The Stokes diameter at the point of the peak (Point A of FIG. 2 herein) of the distribution curve of Stokes diameter.

Median Stokes diameter—(Dst for reporting purposes) the point on the distribution curve of Stokes diameter where 50% by weight of the sample is either larger or smaller (Point H of FIG. 2 herein). It therefore represents the median value of the determination.

The values for DmodeC and $(\Delta D_{50})C$ were determined by first compressing the samples according to the procedure set forth in ASTM D 3493 and then evaluating the compressed samples using the above-described procedure.

The abrasion data of the rubber compositions were determined using a Lambourn abrader. The test pieces had an outer diameter of 54.0 mm and a thickness of 12.7 mm. The emery wheel had an abrasive grain of C type, a grain size of #80 and a binding degree of K. The relative slip ratio between the Emery wheel surface and the test piece was 25%. The test load was 12 kg. 10 g/min of carborundum grain, grain size #100, was added. In the following examples, the abrasion index is the ratio of the abrasion rate of a control composition containing IRB #6 carbon black, divided by the abrasion rate of a composition produced using a specified carbon black of the present invention at the same slip.

The modulus, tensile and elongation of the rubber compositions were measured by the procedure set forth in ASTM D 412.

The effectiveness and advantages of the present invention will be further illustrated by the following examples.

EXAMPLES 1-3

Three examples of the novel carbon blacks of the present invention were prepared in three different carbon black production runs, in a reactor generally described herein, and as depicted in FIG. 1, utilizing the reactor conditions and geometry set forth in Table I. The properties of the fuel oil utilized in the combustion reaction in each example, and the properties of the feedstock utilized in each example are shown below:

|  | Fuel Oil | Feedstock Oil |
|---|---|---|
| Hydrogen/Carbon Ratio | 1.21 | 0.76 |
| Hydrogen (wt. %) | 9.22 | 5.89 |
| Carbon (wt. %) | 90.64 | 92.06 |
| Sulfur (wt. %) | 0.03 | 0.50 |
| BMCI (Visc-Grav) | 40 | 148 |
| A.P.I. Gravity 15.5/15.6 C(60)F [ASTM D-287] | 22.30 | −4.59 |
| Specific Gravity 15.5/15.6 C(60)F [ASTM D-287] | 0.920 | 1.115 |
| Viscosity, SUS (130° F.) [ASTM D-88] | 40 | 50 |
| Viscosity, SUS (210° F.) [ASTM D-88] | 33 | 40 |

| | CARBON BLACKS | | |
|---|---|---|---|
| | Example 1 | Example 2 | Example 3 |
| D-1, in. | 20.7 | 20.7 | 20.7 |
| D-2, in. | 12.4 | 12.4 | 12.4 |
| D-3, in. | 18.0 | 18.0 | 18.0 |
| L-1, in. | 37.5 | 37.5 | 37.5 |
| L-2, in. | 29.5 | 29.5 | 29.5 |
| L-3, in. | 11.5 | 11.5 | 11.5 |
| L-4, in. | 48.0 | 48.0 | 48.0 |
| F-1, in. | 5.75 | 5.75 | 5.75 |
| F-2, in. | 12.5 | 0.00 | 0.00 |
| Q, in. | 30 | 30 | 30 |
| Oil Inj. Pt. 32, Tips # × Size, in. | 12 × 0.0595 | 12 × 0.0595 | 12 × 0.0595 |
| Oil Rate Pt. 32, gph | 708 | 677 | 754 |
| Oil Press. Pt. 32, psig | 156 | 299 | 249 |
| Oil Preheat Pt. 32, °F. | 248 | 248 | 248 |
| Oil Inj. Pt. 34, Tips # × Size, in. | 6 × 0.595 | 6 × 0.595 | 6 × 0.595 |
| Oil Rate Pt. 34, gph | 264 | 337 | 258 |
| Oil Press. Pt. 34, psig | 306 | 299 | 256 |
| Oil Preheat Pt. 34, °F. | 248 | 248 | 248 |
| Comb. Air, kscfh | 640 | 600 | 710 |
| Comb. Air Preheat, °F. | 1240 | 1240 | 1240 |
| Fuel, gph | 357 | 338 | 399 |
| Air to Burn Ratio | 1.34 | 1.34 | 1.34 |
| Potassium, lb./hr. | 0 | 0.032 | 0.013 |
| Quench Press., psi | 228 | 220 | 313 |
| Temp. at Quench, °F. | 1560 | 1560 | 1560 |

Inj. = Injection; Comb. = combustion; Press. = pressure; Pt. 32 = Point 32 on FIG. 1; Pt. 34 = Point 34 on FIG. 1; gph = gallons per hour; psi = pounds per square inch; kscfh = standard cubic feet per hour, in thousands; in. = inches; °F. = degrees Fahrenheit The carbon blacks produced in each run were then analyzed according to the procedures described herein. The analytical properties of the blacks produced in each run, three comparative example (C.E.) blacks, as well as an IRB #6 reference carbon black sample, were as follows:

| | Carbon Black | | | | | | |
|---|---|---|---|---|---|---|---|
| | Ex 1 | Ex 2 | Ex 3 | CE 1 | CE 2 | CE 3 | IRB #6 |
| $N_2SA$ (m²/g) | 144 | 146 | 160 | 136 | 147 | 139 | 76 |
| $I_2$ No. (mg/g) | 146 | 148 | 149 | 144 | 148 | 140 | 80 |
| CTAB m²/g | 151 | 147 | 153 | 121 | 139 | 135 | 79 |
| DBP (cc/100 g) | 128 | 119 | 128 | 114 | 129 | 114 | 100 |
| CTAB/$I_2$ No. | 1.03 | 0.99 | 1.03 | 0.84 | 0.94 | 0.96 | 0.99 |
| $N_2$ SA/CTAB | 0.95 | 0.99 | 1.05 | 1.12 | 1.06 | 1.03 | 0.96 |
| Dmode$_U$ (μm) | 65 | 71 | 64 | 80 | 75 | 70 | 110 |

-continued

| | Carbon Black | | | | | | |
|---|---|---|---|---|---|---|---|
| | Ex 1 | Ex 2 | Ex 3 | CE 1 | CE 2 | CE 3 | IRB #6 |
| ΔD 50$_U$ (μm) | 51 | 52 | 51 | 57 | 62 | 66 | 75 |
| Dmode$_C$ (μm) | 65 | 70 | 63 | 80 | 71 | 65 | 103 |
| ΔD 50$_C$ (μm) | 58 | 59 | 60 | 59 | 75 | 73 | 74 |
| Dmode$_C$/Dmode$_U$ | 1.00 | 0.99 | 0.98 | 1.00 | 0.95 | 0.93 | 0.99 |
| ΔD 50$_C$/ΔD 50$_U$ | 1.14 | 1.13 | 1.18 | 1.04 | 1.21 | 1.11 | 0.96 |

CE = comparative example carbon black

EXAMPLE 4

This Example illustrates the use of the novel carbon blacks of the present invention in natural rubber compositions.

Natural rubber compositions incorporating the novel carbon blacks of the present invention, the carbon blacks of the comparative examples and IRB #6 were prepared according to the following recipe.

| NATURAL RUBBER FORMULATION (ASTM D-3192-1985) | |
|---|---|
| Ingredient | Parts By Weight |
| Natural Rubber | 100 |
| Carbon Black | 50 |
| Zinc Oxide | 5 |
| Stearic Acid | 3 |
| Accelerator MBTS | 0.6 |
| Sulfur | 2.5 |

MBTS = mercaptobenzothiazolesulfenamide

Each of the natural rubber compositions was cured at 145° C. for 30 minutes.

Natural rubber composition A was prepared with the carbon black of Example 1. Natural rubber composition B was prepared with the carbon black of Example 2. Natural rubber composition C was prepared with the carbon black of Example 3. Natural rubber composition D was prepared with the carbon black of comparative example 1. Natural rubber composition E was prepared with the carbon black of comparative example 2. Natural rubber composition F was prepared with the carbon black of comparative example 3. Natural rubber composition G was prepared with IRB #6 carbon black.

The static properties of the natural rubber compositions were then evaluated according to the ASTM procedures described herein. The results were as follows:

| Natural Rubber Composition | Modulus 300% El* Kgf/cm$^2$ | Tensile Strength Kgf/cm$^2$ | El$_b$* % | Rebound % | Abrasion Index % |
|---|---|---|---|---|---|
| A (Ex. 1) | 159 | 294 | 475 | 43.5 | 128 |
| B (Ex. 2) | 161 | 295 | 470 | 44.3 | 138 |
| C (Ex. 3) | 147 | 288 | 485 | 43.8 | 125 |
| D (C.E. 1) | 149 | 276 | 495 | 43.0 | 115 |
| E (C.E. 2) | 160 | 266 | 500 | 41.5 | 111 |
| F (C.E. 3) | 145 | 280 | 480 | 42.8 | 118 |
| G (IRB #6) | 143 | 263 | 485 | 55.8 | 100 |

*El = elongation; El$_b$ = elongation at break;

These results show that the tensile strength of the natural rubber compositions produced with the carbon blacks of the present invention was higher than the tensile strength of the comparative blacks. Therefore the carbon blacks of the present invention impart higher reinforcing properties to natural rubber compositions. Further, the rebound value of the rubber compositions produced with the carbon blacks of the present invention is higher, therefore the hysteresis loss is lower for these compositions. Thus, commercial vehicles, such as buses or trucks, utilizing tires produced with the carbon blacks of the present invention will achieve better gas mileage than vehicles utilizing tires produced with the comparative blacks. Still further, the abrasion index for the rubber compositions produced with the carbon blacks of the present invention is higher than that of the rubber compositions produced with the comparative blacks. Therefore, bus and truck tires produced with the carbon blacks of the present invention will have longer tread life than tires produced with the comparative blacks.

EXAMPLE 5

This Examples illustrates the use of the novel carbon blacks of the present invention in synthetic rubber compositions. Synthetic rubber compositions incorporating the novel carbon blacks of the present invention, the carbon blacks of the comparative examples and IRB #6 were prepared according to the following recipe:

| SYNTHETIC RUBBER | |
|---|---|
| Ingredient | Parts By Weight |
| Oil Extended SBR | 89.38 |
| BR | 35.00 |
| Carbon Black | 65.00 |
| Process Oil | 10.62 |
| Zinc Oxide | 3.00 |
| Wax | 2.50 |
| Antioxidant | 2.00 |
| Stearic Acid | 2.00 |
| Accelerator CBS | 1.50 |
| Accelerator MBT | 0.20 |
| Sulfur | 1.75 |

SBR = styrene butadiene rubber
BR = butadiene rubber
CBS = N-cyclohexyl-2-benzothiazolesufenamide
MBT = 2-mercaptobenzothiazole Each of the synthetic rubber compositions was cured at 145° C. for 30 minutes.

Synthetic rubber composition T was prepared with the carbon black of Example 1. Synthetic rubber composition U was prepared with the carbon black of Example 2. Synthetic rubber composition V was prepared with the carbon black of Example 3. Synthetic rubber composition W was prepared with the carbon black of comparative example 1. Synthetic rubber composition X was prepared with the carbon black of comparative example 2. Synthetic rubber composition Y was prepared with the carbon black of comparative example 3. Synthetic rubber composition Z was prepared with the reference IRB #6 carbon black.

The static properties of the synthetic rubber compositions were then evaluated according to the ASTM procedures described herein. The results were as follows:

| Synthetic Rubber Composition | Modulus 300% El* Kgf/cm² | Tensile Strength Kgf/cm² | $El_b$* % | Rebound % | Abrasion Index, % |
|---|---|---|---|---|---|
| T (Ex. 1) | 89 | 239 | 551 | 41.7 | 124 |
| U (Ex. 2) | 92 | 237 | 567 | 42.5 | 127 |
| V (Ex. 3) | 85 | 230 | 570 | 41.9 | 120 |
| W (C.E. 1) | 82 | 219 | 562 | 41.2 | 115 |
| X (C.E. 2) | 90 | 213 | 544 | 40.8 | 109 |
| Y (C.E. 3) | 79 | 223 | 556 | 41.4 | 117 |
| Z (IRB #6) | 83 | 202 | 613 | 46.4 | 100 |

*El = elongation; $El_b$ = elongation at break;

These results show that the tensile strength of the synthetic rubber compositions produced with the carbon blacks of the present invention was higher than the tensile strength of the comparative blacks. Therefore the carbon blacks of the present invention impart higher reinforcing properties to rubber compositions. Further, the rebound value of the rubber compositions produced with the carbon blacks of the present invention is higher, therefore the hysteresis loss is lower for these compositions. Thus, passenger car vehicles utilizing tires produced with the carbon blacks of the present invention will achieve better gas mileage than vehicles utilizing tires produced with the comparative blacks. Still further, the abrasion index for the rubber compositions produced with the carbon blacks of the present invention is higher than that of the rubber compositions produced with the comparative blacks. Therefore, passenger car tires produced with the carbon blacks of the present invention will have longer tread life than tires produced with the comparative blacks.

As can be seen from the above examples, the carbon blacks of the present invention impart a lower hysteresis while also imparting excellent reinforcing properties (abrasion resistance) to the rubber compositions.

It should be clearly understood that the forms of the present invention herein described are illustrative only and are not intended to limit the scope of the invention. The present invention includes all modifications falling within the scope of the following claims.

We claim:

1. A rubber composition comprising about 100 parts, by weight, of a rubber and from about 10 to about 250 parts, by weight, of a carbon black having an $I_2$ No. of from at least about 135 mg/g to about 200 mg/g, a DBP of from at least about 105 cc/100 g to about 150 cc/100 g, a CTAB/$I_2$ No. ratio of 0.95 to 1.05, a $N_2$SA/CTAB ratio of not greater than 1.05, a Dmode$_C$/Dmode$_U$ ratio of at least 0.96 to about 1.0.

2. The rubber composition of claim 1 wherein the carbon black is additionally characterized by having a $(\Delta D_{50})C/(\Delta D_{50})U$ ratio of at from at least about 1.0 to not greater than about 1.15.

* * * * *